Figure 1:
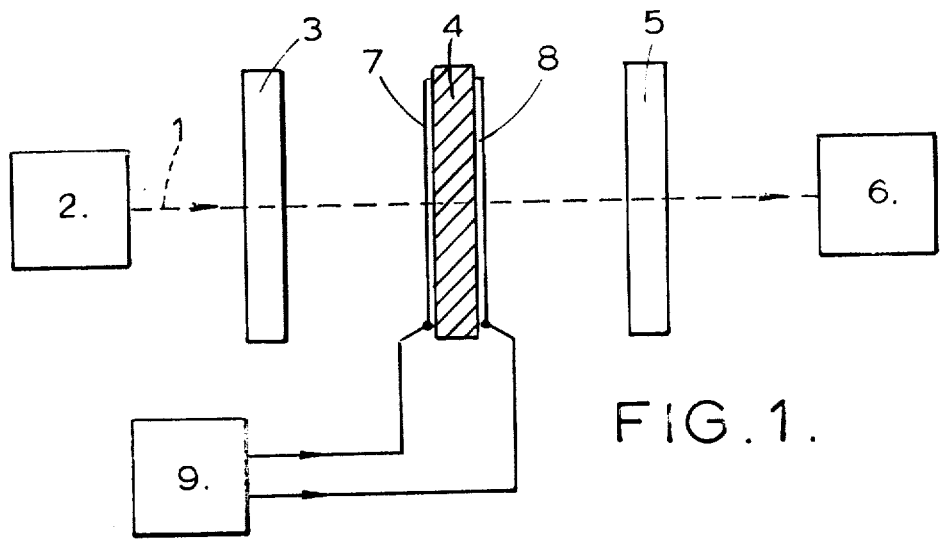

United States Patent
Fox

[11] 3,938,878
[45] Feb. 17, 1976

[54] LIGHT MODULATOR

[75] Inventor: Alan John Fox, Horley, England

[73] Assignee: U.S. Philips Corporation, New York, N.Y.

[22] Filed: Sept. 12, 1974

[21] Appl. No.: 505,591

Related U.S. Application Data

[63] Continuation of Ser. No. 261,288, June 9, 1972, abandoned, which is a continuation of Ser. No. 104,077, Jan. 5, 1971, abandoned.

[30] Foreign Application Priority Data

Jan. 9, 1970 United Kingdom............... 1173/70

[52] U.S. Cl............. 350/150; 350/157; 350/160 R
[51] Int. Cl.$^2$...................... G02F 1/03; G02F 1/29
[58] Field of Search................ 350/150, 157, 160; 250/199

[56] References Cited
UNITED STATES PATENTS

| | | | |
|---|---|---|---|
| 2,936,380 | 5/1960 | Anderson | 350/150 X |
| 3,290,619 | 12/1966 | Geusic et al. | 350/150 X |
| 3,402,002 | 9/1968 | Eden | 350/150 |
| 3,501,219 | 3/1970 | Caulfield | 350/150 |
| 3,531,179 | 9/1970 | Jaffe et al. | 350/150 |
| 3,532,891 | 10/1970 | Simmons et al. | 350/150 UX |
| 3,602,904 | 8/1971 | Cummins | 350/150 X |
| 3,630,597 | 12/1971 | Hulme | 350/150 |

OTHER PUBLICATIONS

"Handbook of Lasers with Selected Data on Optical Technology" Edited by Robert J. Pressley, Published by The Chemical Rubber Co., Cleveland, Ohio, 1971, p. 452.

"Electronic Conduction in Solids" by Arthur C. Smith et al., Published by McGraw-Hill, New York, 1967, pp. 85–88.

*Primary Examiner*—John K. Corbin
*Attorney, Agent, or Firm*—Frank R. Trifari; Simon L. Cohen

[57] ABSTRACT

A light modulator comprises a crystal of the m3m class such as potassium tantalum niobate in which electrically-induced birefringence is obtained by setting up a field within the crystal in a direction which is not parallel to any of the crystallographic axes. With this orientation of the field (preferably at 45° to the axes) the crystal becomes birefringent for light travelling parallel to the field direction. The birefringence is proportional to the square of the field. The modulator may, for example, be constructed as an amplitude modulator in which case it will be situated between a crossed polarizer and analyzer.

22 Claims, 3 Drawing Figures

INVENTOR.
ALAN JOHN FOX

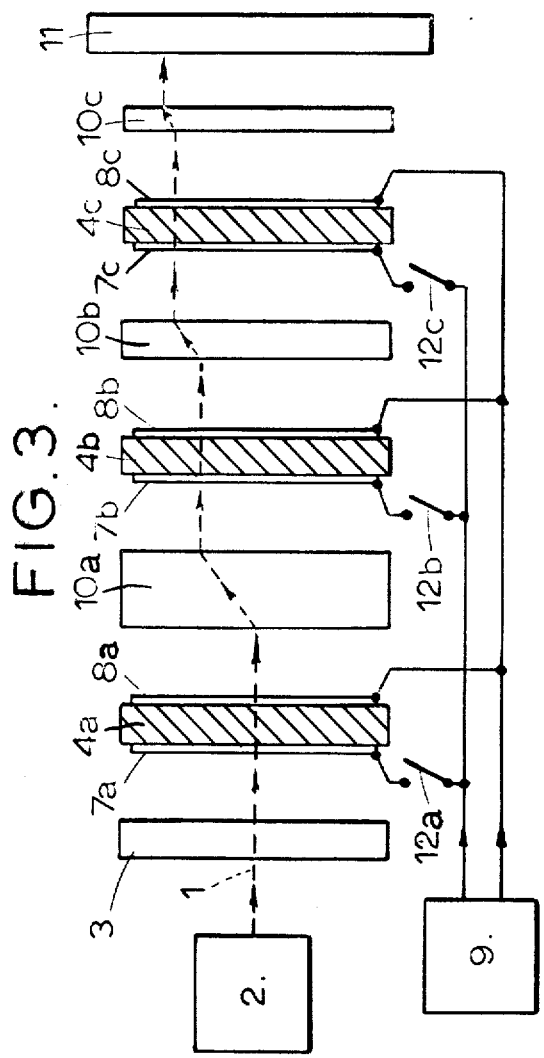

LIGHT MODULATOR

This is a continuation of Ser. No. 261,288 filed June 9, 1972, which is a continuation of Ser. No. 104,077, filed Jan. 5, 1971, now both abandoned.

This invention relates to a light modulator comprising a light-permeable crystal of the m3m point group provided with a pair of conductive electrodes for setting up an electric field in a given direction within the crystal.

It is known that crystals of the m3m point group are birefringent in the presence of an applied electric field and that the resulting ordinary and extraordinary refractive indices thereof can be varied by varying this electric field. Thus the phases of both an ordinary and extraordinary ray of light passing through the crystal in a direction in which the effect is significant will be changed by amounts which depend on the value of the field. For crystals of the m3m point group both the ordinary and the extraordinary refractive indices are proportional to the square of the value of the field, and thus a simple phase-modulator may be formed by a crystal of the m3m point group provided with a pair of conductive electrodes for setting up a field in a given direction within the crystal.

Figure 2:
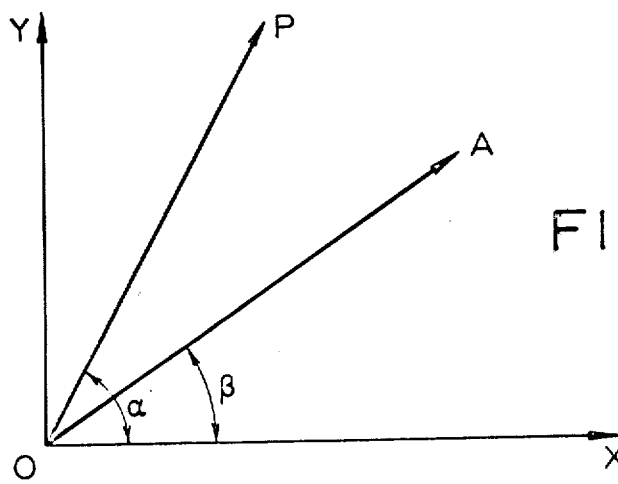

One such modulator is disclosed in FIG. 2 of British patent specification No. 1087042. The crystal used in this modulator is potassium tantalum niobate which will be referred to a KTN (actually $KTa_xNb_{1-x}O_3$ where $x$ has a value from 0.2 to 0.8). The provision of a crossed polarizer and analyzer in the input and output paths for the radiation respectively enables the crystal to operate effectively as an amplitude modulator. The ordinary and extraordinary refractive indices of KTN both have a large dependence upon field, but the magnitude of this dependence is different in the two cases. Thus the application of a field across the crystal can give rise to a large phase-difference between the ordinary and extraordinary rays as they traverse the crystal, with the result that plane-polarized light incident on the crystal from the polarizer is, in general, converted to elliptically polarized light before it reaches the analyzer. Thus the analyzer will transmit light with an intensity which depends upon the square of the magnitude of the applied field. Because of this dependence on the square of the field the dependence of the transmitted intensity on an applied field can be increased, if desired, by maintaining a suitable bias field across the crystal.

It has hitherto been assumed that the aforementioned electro-optic effect in crystals of the m3m point group such as KTN or other perovskited or $BaTiO_3$ is fundamentally a transverse one, i.e., that a maximum effect is observable when the applied field direction is orthogonal to the light path through the crystal and that no effect would be obtained if the applied field and light path were parallel to one another. Thus, in the modulator exemplified in the aforesaid British patent specification, the field is applied to the crystal in a direction which is normal to the direction in which the light passes through the crystal. This relative orientation of the field and light path is a disadvantage for certain applications.

With the orientations of the applied field relative to the crystallographic axes used hitherto it is in fact true that no birefringence is observable if the light traverses the crystal parallel to the field direction. However, it has now been discovered that, with certain orientations of the field relative to the crystallographic axes, the m3m crystal becomes birefringent for light travelling parallel to the field direction.

Accordingly one aspect of the invention provides a light modulator comprising a light-permeable crystal of the m3m point group provided with a pair of electrically conductive light-permeable electrodes for setting up an electric field within the crystal in a direction which is not parallel to any of the crystallographic axes.

The modulator may include means for directing light through the crystal in a direction which is not parallel to any of the crystallographic axes and which is not normal to the field direction. Said means for directing light may be constructed and arranged for directing plane-polarized light through the crystal and a polarization analyzer may be provided in an output path for the light from the crystal, the polarization direction of the analyzer being perpendicular to the polarization direction of the light incident on the crystal. The means for directing light may be a source of plane-polarized light such as a laser, or as an alternative, it may be a source of unpolarized light in combination with a polarizer in the light path between the source and the crystal.

It is likely that the maximum electro-optical effect for light travelling through the crystal in a direction which has a component parallel to the field direction will be obtained when the field direction is at substantially 45° to the crystallographic axes.

The light direction may be substantially parallel to the field direction.

The term "light" is to be understood to include radiation of a frequency which lies outside the visible part of the spectrum. For example potassium tantalum niobate of the composition quoted above is transparent at least over the wavelength range 0.3 $\mu$m to 6$\mu$m so that a modulator for infra-red radiation can be constructed using this material.

Embodiments of the invention will now be described, by way of example, with reference to the accompanying diagrammatic drawings wherein FIG. 1 is a schematic of one embodiment of the invention, FIG. 2 is a graph showing the parameters of the optical elements in FIG. 1, and FIG. 3 is a schematic of another embodiment according to the invention.

In FIG. 1 radiation 1 of wavelength 0.63$\mu$m from a source 2 passes through a polarizer 3, a crystal 4 of $KTa_{0.65}Nb_{0.35}O_3$ a polarization analyzer 5 crossed relative to polarizer 3, and is detected by a detector 6. The crystal 4 (which is viewed edge-on) is 0.2 mm thick and is cut so that the major faces thereof are perpendicular to the (0, 1, 1) crystal direction and thus the light 1 travels parallel to this direction. Radiation-permeable electrically conductive electrodes 7 and 8 are provided on the major faces of the crystal 4. These electrodes may be provided, for example, by evaporating a layer of tin oxide onto each face.

A pulse generator 9 applies electrical pulses having an amplitude of approximately 225 volts across the electrodes 7, 8. This amplitude is such as to cause a relative phase change of 180° between the ordinary and extraordinary light rays passing through crystal 4, i.e., a relative retardation of half a wavelength in one ray relative to the other is obtained with an applied voltage of 225 V. Thus the polarization plane of the light incident on the crystal 4 is rotated through 90° therein and the light emerging from the crystal is transmitted by analyzer 5 during the pulse peaks, provided that the crystal 4 is orientated relative to the polarizer 3 so that the extraordinary and ordinary rays therein have the same amplitude, i.e., provided that the polarization directions of 3 and 5 are at 45° to the fast and slow directions of the crystal 4. During the intervals between pulses no light will be transmitted by analyzer 5. Thus the light incident on detector 6 will be "chopped" at the pulse frequency (which may be ~100 Hz). This feature is useful in certain applications where light of very low intensity has to be detected.

If desired, the required pulse height (225V) from generator 9 may be reduced by maintaining a standing d.c. bias across electrodes 7 and 8 of such value as to cause a phase difference between the output ordinary and extraordinary rays of $2n\pi$ where $n$ is an integer. This is because the birefringence of crystal 4 is proportional to the square of the applied voltage.

It will be evident that the normal state of the modulator 3, 4, 5, 7, 8 of FIG. 1 may, as an alternative, be made transmissive, if the directions of polarizer 3 and analyzer 5 are made parallel or if the bias field is such as to cause a phase difference of $(2n-1)\pi$ between the output ordinary and extraordinary rays, the transmission being reduced to zero in the presence of the applied pulses.

The KTN modulator is particularly suitable for use with an indium antimonide photo-detector because the transmission characteristic of the former closely matches the response curve of the latter. With a modulator and a detector of these materials the radiation 1 from the source 2 may have a wavelength up to 6μm. A change in wavelength will, however, affect the pulse height necessary for changing from transmission by the modulator to extinction, or vice versa, because the necessary pulse height (nominally 225V for $=0.63\mu m$) is proportional to the square root of the wavelength and to the inverse three-halves of the normal refractive index of the KTN for the radiation.

It should be noted that the acceptance angle of a modulator according to the invention is quite large (~30°) so that it is not normally necessary that the radiation from the source 2 be collimated.

An alternative material for the crystal 4 is barium titanate, cut in the same way. However, the Curie point for this material is high (~120°C) so that it would have to be heated to above this temperature if it were to operate satisfactorily.

Growth and compositional details of a suitable crystal 4 of KTN are described in the aforesaid British patent specification No. 1,087,042. It should be noted that cutting a crystal 4 so that its major faces lies in the direction described tends to give a better optical result than if the major faces were parallel to the crystal facets. In the latter case the growth striae tend to be troublesome, but when cutting is at an angle to the crystal facets the striae tend to average out with the result that the optical quality appears more uniform.

The arrangement of FIG. 1 may alternatively be used as a source of light of variable frequency if the detector 6 and the generator 9 are omitted and the source 2 is broad-band, the components, 3, 4 and 5 then acting as a filter of variable pass-band frequency. Referring to FIG. 2, if the fast and slow directions of the crystal 4 are OY and OX, and the polarization directions of polarizer 3 and analyzer 5 are OP and OA respectively, it can be shown (see e.g., "Light" by R. W. Ditchburn published by Blackie (1952) equation 12(43) page 386) that the light intensity E transmitted by analyzer 5 is given by:

$E = a^2\cos^2(\alpha-\beta)-a^2\sin 2\alpha\sin 2\beta \sin^2 \tfrac{1}{2}\epsilon_p$ where $a$ is the amplitude of the light from source 2 at a wavelength $\lambda$ in air and $\epsilon_p$ is given by:

$\epsilon_p = 2\pi e/\lambda(\mu_2-\mu_1)$ where $e$ is the thickness of crystal 4 and $\mu_1$ and $\mu_2$ are the refractive indices of the crystal 4 in the fast and slow directions respectively.

If the polarizer and analyzer are crossed the first term in the equation for $E$ becomes zero and $E = -a^2\sin 2\alpha \sin 2\beta \sin^2 \pi e/\lambda (\mu_2-\mu_1)$.

Thus, providing that the polarization directions of the (crossed) polarizer and analyzer do not coincide with the fast and slow directions of the crystal 4, $E\alpha \sin^2 (\mu_2-\mu_1)\lambda \pi e$.

This variation with $\lambda$ is a maximum if $\sin 2\alpha = \sin 2\beta = 1$ i.e., if $\alpha$ and $\beta = 45°$, 135°... etc.

Then $E = -a^2\sin^2 (\mu_2-\mu_1)/\lambda \pi e$.

and E is a maximum when $\mu_2-\mu_1/\lambda\, e = \tfrac{1}{2}, 3/2,$ etc.

i.e., when $\mu_2-\mu_1 = \lambda/2e, 3\lambda/2e, 5\lambda/2e$ etc.

Similarly $E$ is zero when $\mu_2-\mu_1 = 0$, $\lambda/e$, $2\lambda/e$ etc.

Thus, if $\mu_2-\mu_1$ is varied by varying the potential across the electrodes 7 and 8 in FIG. 1, the values of $\lambda$ which are transmitted and the values of $\lambda$ which are stopped by the components 3, 4, 5 of FIG. 1 will be varied, these components thus forming a filter whose passband(s) for the light from source 2 can be varied in position in the spectrum in this way. Such a filter may be used, for example, as a switchable colour filter in a colour television display.

FIG. 3 shows a deflector for deflecting a parallel beam of light from a source 2 to a plurality of positions on a screen 11. The light 1 from source 2 is plane-polarized by a polarizer 3 (if the source 2 emits plane-polarized light the polarizer 3 may be omitted) so that it has a polarization direction at 45° to the fast and slow directions of a first m3m crystal 4a cut and provided with electrodes 7a and 7b so that it is substantially identical with that described with reference to FIG. 1. Similar crystals and electrodes 4b, 4c, 7b, 7c and 8b, 8c are also provided in the light path 1. A source 9 of approximately 225v (again this voltage may be reduced if a suitable steady bias is maintained across each pair of electrodes 7, 8) can be applied across any pair of electrodes 7, 8 by means of switches 12a, 12b and 12c to cause a phase differences of $\pi$ between the ordinary and extraordinary light rays in any of the crystals 4a, 4b, and 4c.

In the output path of the light from each crystal of the group 4, 44b, and 4c is situated a uniaxial crystal of the group 10a, 10b, and 10c made, for example, of calcite and orientated so that its fast and slow directions are at 45° to those of the preceding crystal of the group 4a, 4b, and 4c. Each crystal of the group 10a, 10b, and 10c has half the thickness of the preceding crystal of the group 10a, 10b, and 10c, and the crystal of the group 4a, 4b, and 4c following each crystal of the group 10a, 10b, and 10c has its fast and slow directions at 45° to the fast and slow directions of the preceding crystal of the group 10a, 10b, and 10c.

If, now, 225 volts from the source 9 is applied to crystal 4a by closing switch 12a the plane of polarization of the light emerging from crystal 4a will be rotated through 90°, i.e., from one of the fast and slow directions to the other of crystal 10a. Thus it can be changed from an ordinary ray to an extraordinary ray for the crystal 10a and will be displaced sideways by an amount depending on the thickness of crystal 10a. A similar effect will be obtained on closing switches 12b and 12c for the crystals 10b and 10c, but the displacement due to each crystal will be half that due to the preceding crystal of the group 10a, 10b, and 10c. Thus, with the three crystals 4a, 4b, and 4c shown, the area of incidence of the light beam 1 on the screen 11 can be switched between eight equally spaced positions which lie on a straight line. This number may be increased, if desired, by increasing the number of crystal pairs, and the "scan" obtained thereby can be made two-dimensional by providing a further group of crystal pairs for deflecting the area of incidence parallel to the plane of the paper of FIG. 3. If desired, the beam 1 may be focussed to a point on screen 11 by providing a converging lens (not shown) in the path thereof.

The arrangement of FIG. 3 may be used, for example, for displaying images on the screen 11 if an amplitude modulator is provided between source 2 and screen 11 or, if screen 11 is replaced by an optical storage bank such as an array of photo-diodes, the light deflector may be used as an addressing arrangement therefor.

What is claimed is:

1. A light modulator comprising a light-permeable crystal of the m3m point group provided with a pair of electrically conductive light-permeable electrodes for setting up an electric field within the crystal in a direction making an angle greater than zero with all of the crystallographic axes, means for directing light polarized in a plane at an angle to the fast and slow directions of the crystal through the crystal in a direction making an angle greater than zero with all of the crystallographic axes and which makes an angle smaller than 90° with the field direction, and a polarization analyzer provided in an output path for the light from the crystal.

2. A modulator as claimed in claim 1, wherein the polarization direction of the analyzer is perpendicular to the polarization direction of the light incident on the crystal.

3. A modulator as claimed in claim 1, wherein the polarization directions of the incident light and the analyzer are at substantially 45° to the fast and slow directions of the crystal.

4. A modulator as claimed in claim 1, wherein the means for directing polarized light comprises a source of unpolarized light with a polarizer in a light path between it and the crystal.

5. A modulator as claimed in claim 1, constructed and arranged so that the light direction through the crystal will be substantially parallel to the field direction.

6. A modulator as claimed in claim 5, constructed and arranged as a light beam deflector, the means for directing light through the crystal being arranged so that the so-directed light will be plane-polarized at substantially 45° to the fast and slow directions of the crystal, a uniaxial plate being provided in the output path of the light from the crystal with its fast and slow directions at substantially 45° to those of the crystal.

7. A modulator as claimed in claim 1, constructed and arranged so that the field direction will be at substantially 45° to the crystallographic axes.

8. A modulator as claimed in claim 1, wherein said crystal is a crystal of potassium tantalum niobate having the formula $KTa_xNb_{1-x}O_3$ where $x$ has a value from 0.2 to 0.8.

9. A modulator as claimed in claim 8, including an indium antimonide photo-conductive detector for light transmitted by the crystal.

10. A light modulator comprising a light-permeable crystal plate of the m3m point group provided with a pair of electrically conductive light-permeable electrodes on the major faces thereof for setting up an electric field within the crystal in a direction making an angle greater than zero with all of the crystallographic axes, and a polarization analyzer facing one of said major faces.

11. A modulator as claimed in claim 10 including a polarizer facing the other of said major faces.

12. A modulator as claimed in claim 9 wherein the polarizer has its polarization direction at substantially 45° to the fast and slow directions of the crystal, and the polarization analyzer also has its polarization direction at substantially 45° to said fast and slow directions.

13. A modulator as claimed in claim 12 wherein the polarizer is crossed relative to the analyzer.

14. A light modulator comprising a light-permeable crystal plate of the m3m point group provided with a pair of electrically conductive light-permeable electrodes on the major faces thereof for setting up an electric field within the crystal in a direction making an angle greater than zero with all of the crystallographic axes, and an uniaxial plate facing a said major face with its fast and slow directions at substantially 45° to those of the crystal.

15. A light modulator comprising a light-permeable electro-optic crystal of the m3m point group provided with a pair of electrically conductive light-permeable substantially planar electrodes confronting two opposite sides of the crystal for setting up a substantially linear electric field within the crystal in a direction making an angle greater than zero with all of the crystallographic axes, means for directing light polarized in a plane at substantially 45° to the fast and slow directions of the crystal through the crystal in a direction making an angle greater than zero with all of the crystallographic axes and making an angle less than 90° with the direction of the electric field.

16. A modulator as claimed in claim 15, wherein the light direction through the crystal is substantially parallel to the direction of the electric field.

17. A modulator as claimed in claim 15 wherein the direction of the electric field makes an angle of approximately 45° with at least two of the crystallographic axes.

18. A modulator as claimed in claim 15 wherein the means for directing polarized light comprises a source of unpolarized light and a polarizer in the light path between the unpolarized light source and the crystal.

19. A modulator as claimed in claim 15 further comprising a uniaxial plate in an output path of the light from the crystal, wherein the fast and slow directions of the uniaxial plate make an angle of approximately 45° with the fast and slow axes of the crystal.

20. A modulator as claimed in claim 15 further comprising a polarization analyzer in an output path of the light from the crystal, said analyzer having a polarization direction substantially perpendicular to the polarization direction of the light from said light directing means.

21. A modulator as claimed in claim 15, wherein the crystal is a crystal of potassium tantalum niobate having the formula $KTa_xNb_{1-x}O_3$ where x has a value of from 0.2 to 0.8.

22. A modulator as claimed in claim 21 further comprising an indium antimonide photo-conductive detector in the path of light transmitted by the modulator.

* * * * *

UNITED STATES PATENT AND TRADEMARK OFFICE
CERTIFICATE OF CORRECTION

PATENT NO. : 3,938,878
DATED : February 17, 1976
INVENTOR(S) : ALAN JOHN FOX

It is certified that error appears in the above-identified patent and that said Letters Patent are hereby corrected as shown below:

Col. 4, line 52, "4, 44b, and 4c" should be --4a, 4b, and 4c--;

Claim 12, line 1, "9" should be --11--;

Signed and Sealed this fifteenth Day of June 1976

[SEAL]

Attest:

RUTH C. MASON
*Attesting Officer*

C. MARSHALL DANN
*Commissioner of Patents and Trademarks*